United States Patent
Han et al.

(10) Patent No.: US 10,491,289 B2
(45) Date of Patent: Nov. 26, 2019

(54) METHOD AND APPARATUS FOR TRANSMITTING AND RECEIVING SIGNAL USING DEVICE-TO-DEVICE COMMUNICATION AND SUPERPOSITION CODING IN WIRELESS COMMUNICATION SYSTEM

(71) Applicant: LG ELECTRONICS INC., Seoul (KR)

(72) Inventors: Sangwook Han, Seoul (KR); Sangrim Lee, Seoul (KR); Hojae Lee, Seoul (KR); Gwanmo Ku, Seoul (KR)

(73) Assignee: LG ELECTRONICS INC., Seoul (KR)

(*) Notice: Subject to any disclaimer, the term of this patent is extended or adjusted under 35 U.S.C. 154(b) by 3 days.

(21) Appl. No.: 15/683,092

(22) Filed: Aug. 22, 2017

(65) Prior Publication Data

US 2019/0068274 A1    Feb. 28, 2019

(51) Int. Cl.
| | |
|---|---|
| *H04B 7/14* | (2006.01) |
| *H04W 72/00* | (2009.01) |
| *H04W 8/00* | (2009.01) |
| *H04B 7/155* | (2006.01) |
| *H04W 88/04* | (2009.01) |
| *H04W 88/08* | (2009.01) |

(52) U.S. Cl.
CPC ............ *H04B 7/14* (2013.01); *H04B 7/15528* (2013.01); *H04W 8/005* (2013.01); *H04W 72/005* (2013.01); *H04W 88/04* (2013.01); *H04W 88/08* (2013.01)

(58) Field of Classification Search
CPC ... H04B 7/14; H04B 7/15528; H04W 72/005; H04W 8/005; H04W 88/04; H04W 88/08
USPC ......................................................... 370/315
See application file for complete search history.

(56) References Cited

U.S. PATENT DOCUMENTS

| | | | |
|---|---|---|---|
| 2014/0022982 A1* | 1/2014 | Kim ................ | H04L 1/0077 370/315 |
| 2016/0192420 A1* | 6/2016 | Kim ................ | H04W 74/00 370/329 |
| 2018/0152915 A1* | 5/2018 | Kalhan ............ | H04W 72/04 |
| 2018/0184436 A1* | 6/2018 | Ohtsuji ........... | H04W 88/04 |
| 2018/0213379 A1* | 7/2018 | Xiong ............. | H04W 4/70 |

* cited by examiner

*Primary Examiner* — Faisal Choudhury
(74) *Attorney, Agent, or Firm* — Birch, Stewart, Kolasch & Birch, LLP

(57) ABSTRACT

Disclosed herein is a method of transmitting a signal at a relay user equipment (UE) in a wireless communication system. The method includes receiving uplink data for relay from a first UE, performing superposition coding with respect to the uplink data and sidelink data to be transmitted to a second UE through a sidelink to generate an uplink relay signal, and transmitting the uplink relay signal to a base station and the second UE.

6 Claims, 14 Drawing Sheets

(A) CONTROL-PLANE PROTOCOL STACK (B) USER-PLANE PROTOCOL STACK

METHOD AND APPARATUS FOR TRANSMITTING AND RECEIVING SIGNAL USING DEVICE-TO-DEVICE COMMUNICATION AND SUPERPOSITION CODING IN WIRELESS COMMUNICATION SYSTEM

BACKGROUND OF THE INVENTION

Field of the Invention

The present disclosure relates to a wireless communication system, and more particularly, to a method and apparatus for transmitting and receiving a signal using device-to-device communication and superposition coding in a wireless communication system.

Discussion of the Related Art

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

SUMMARY OF THE INVENTION

Accordingly, the present disclosure is directed a method and apparatus for transmitting and receiving a signal using device-to-device communication and superposition coding in a wireless communication system that substantially obviate one or more problems due to limitations and disadvantages of the related art.

An object of the present disclosure is to provide a method and apparatus for transmitting and receiving a signal using device-to-device communication and superposition coding in a wireless communication system.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a signal at a relay user equipment (UE) in a wireless communication system includes receiving uplink data for relay from a first UE, performing superposition coding with respect to the uplink data and sidelink data to be transmitted to a second UE through a sidelink to generate an uplink relay signal, and transmitting the uplink relay signal to a base station and the second UE.

The receiving of the uplink data may include receiving a relay request signal from the first UE, transmitting an acceptance signal to the first UE in response to the relay request signal, and receiving the uplink data from the first UE in response to the acceptance signal.

The receiving of the relay request signal from the first UE may includes broadcasting a relay target search signal and receiving the relay request signal from the first UE in response to the relay target search signal.

The method may further include receiving downlink data for relay from the base station, performing superposition coding with respect to the downlink data and the sidelink data to generate a downlink relay signal, and transmitting the downlink relay signal to the first UE and the second UE.

In another aspect of the present invention, a relay user equipment (UE) in a wireless communication system includes a wireless communication module and a processor connected to the wireless communication module. The processor receives uplink data for relay from a first UE, performs superposition coding with respect to the uplink data and sidelink data to be transmitted to a second UE through a sidelink to generate an uplink relay signal, and transmits the uplink relay signal to a base station and the second UE.

The processor may receive a relay request signal from the first UE, transmit an acceptance signal to the first UE in response to the relay request signal, and receive the uplink data from the first UE in response to the acceptance signal. The processor may broadcast a relay target search signal and receive a relay request signal from the first UE in response to the relay target search signal.

The processor may receive downlink data for relay from the base station, perform superposition coding with respect to the downlink data and the sidelink data to generate a downlink relay signal, and transmit the downlink relay signal to the first UE and the second UE.

The uplink relay signal and the downlink relay signal may be transmitted using resources for transmitting the sidelink data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

Figure 1:
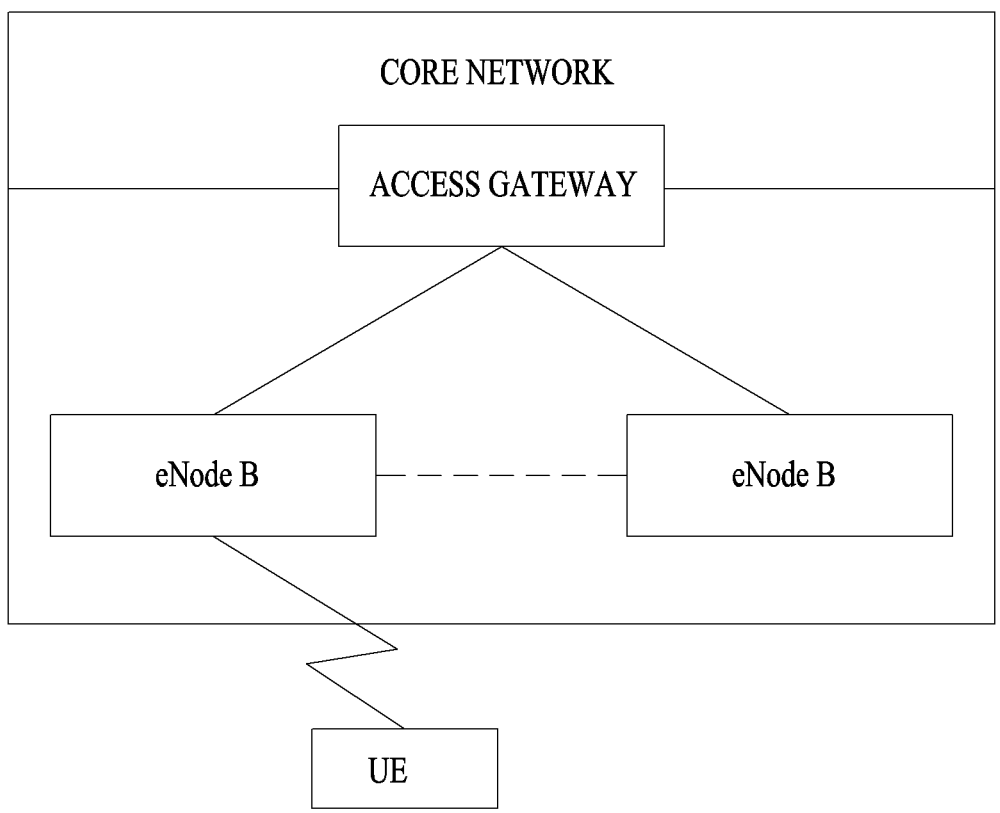
FIG. 1 is a diagram schematically illustrating a network structure of an E-UMTS as an exemplary radio communication system.
Figure 2:
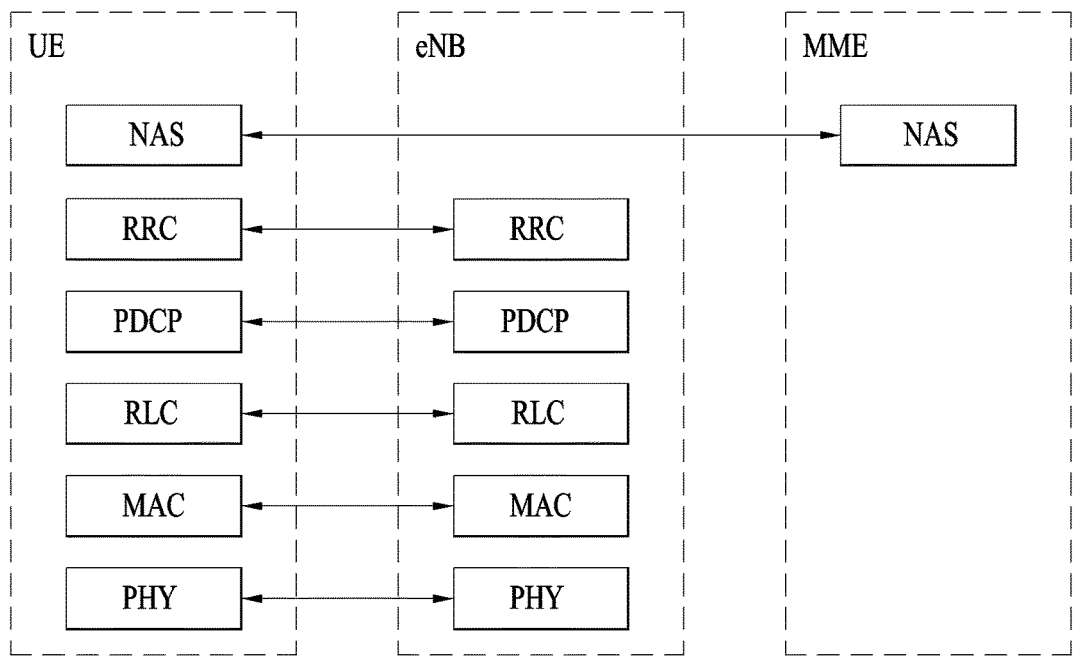
FIG. 2 is a diagram illustrating structures of a control plane and a user plane of a radio interface protocol between a UE and an E-UTRAN based on the 3GPP radio access network specification.
Figure 2:
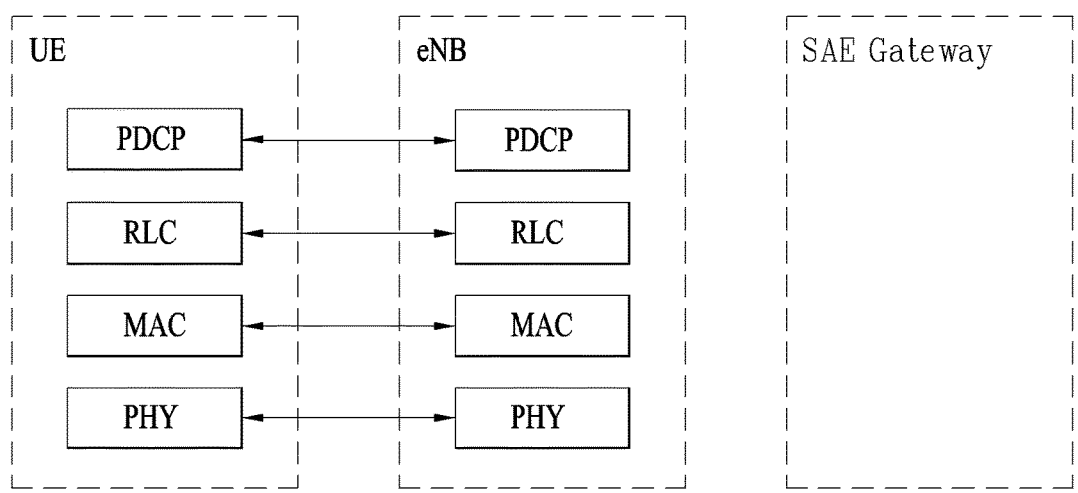

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A single cell consisting of an eNB is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
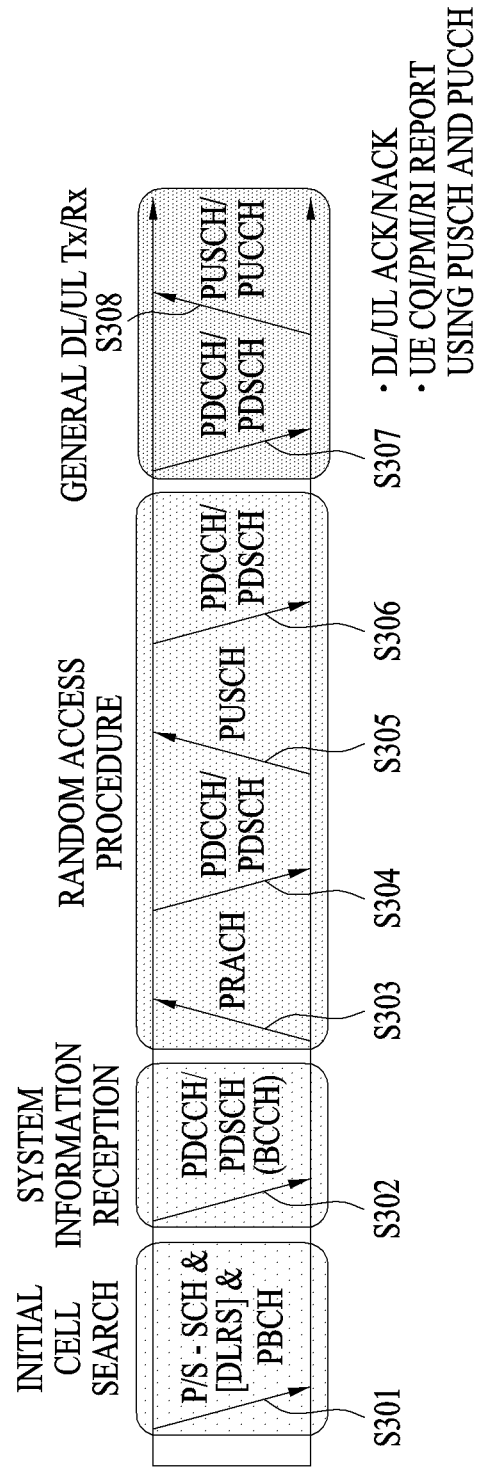
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S—SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
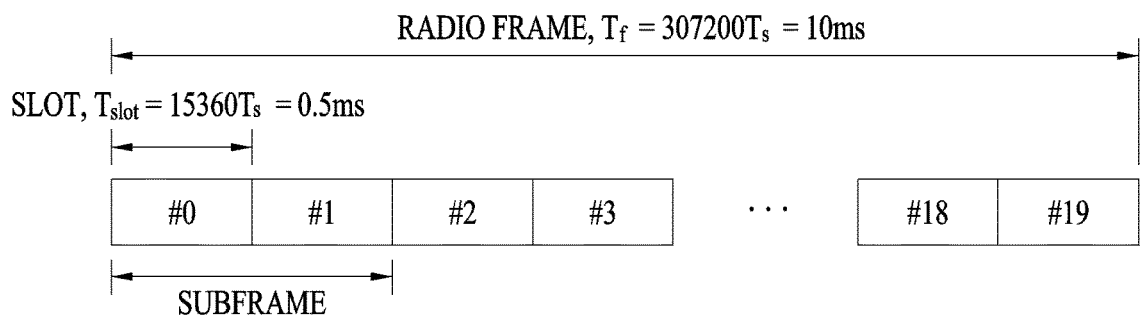
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10-8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
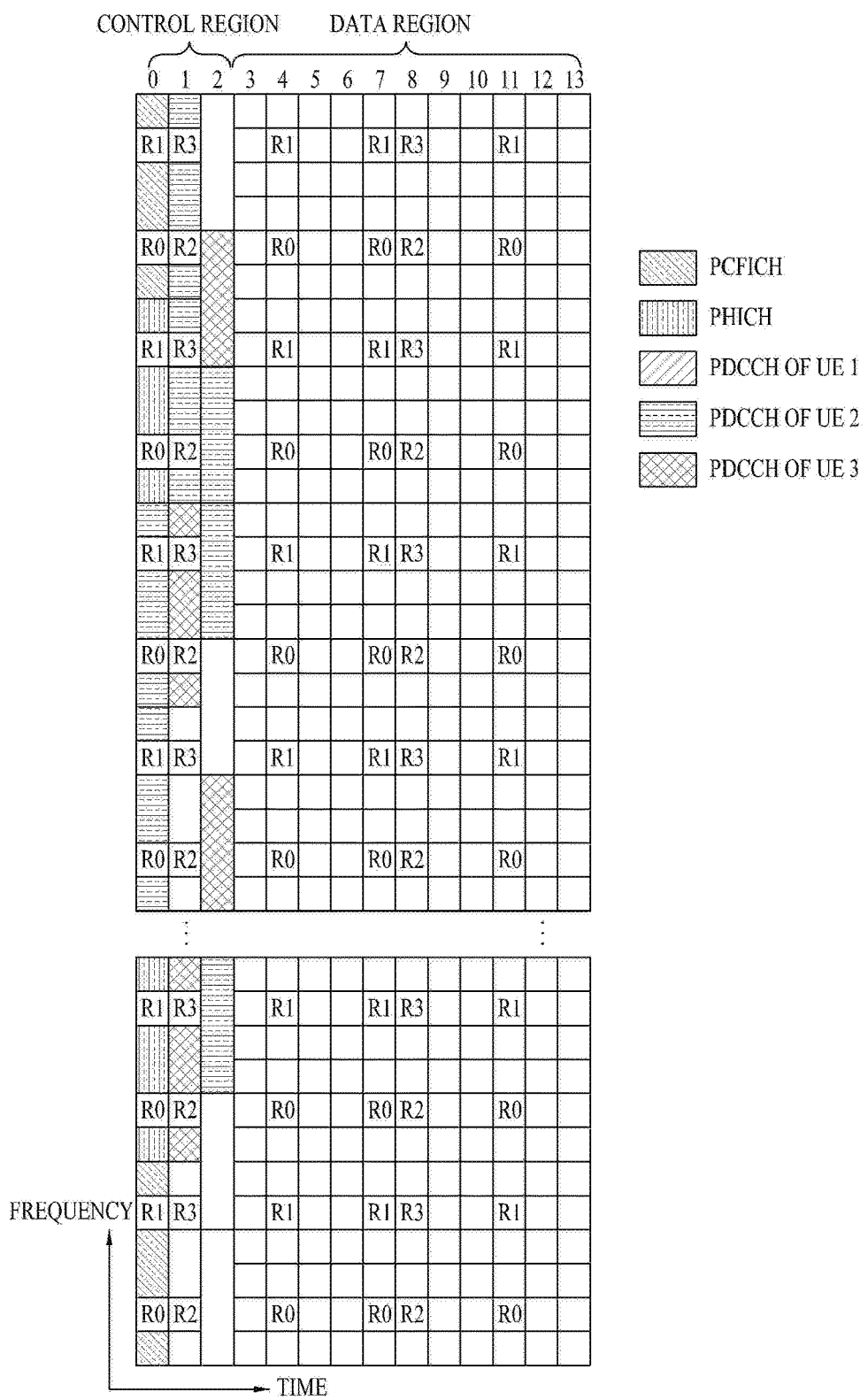
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
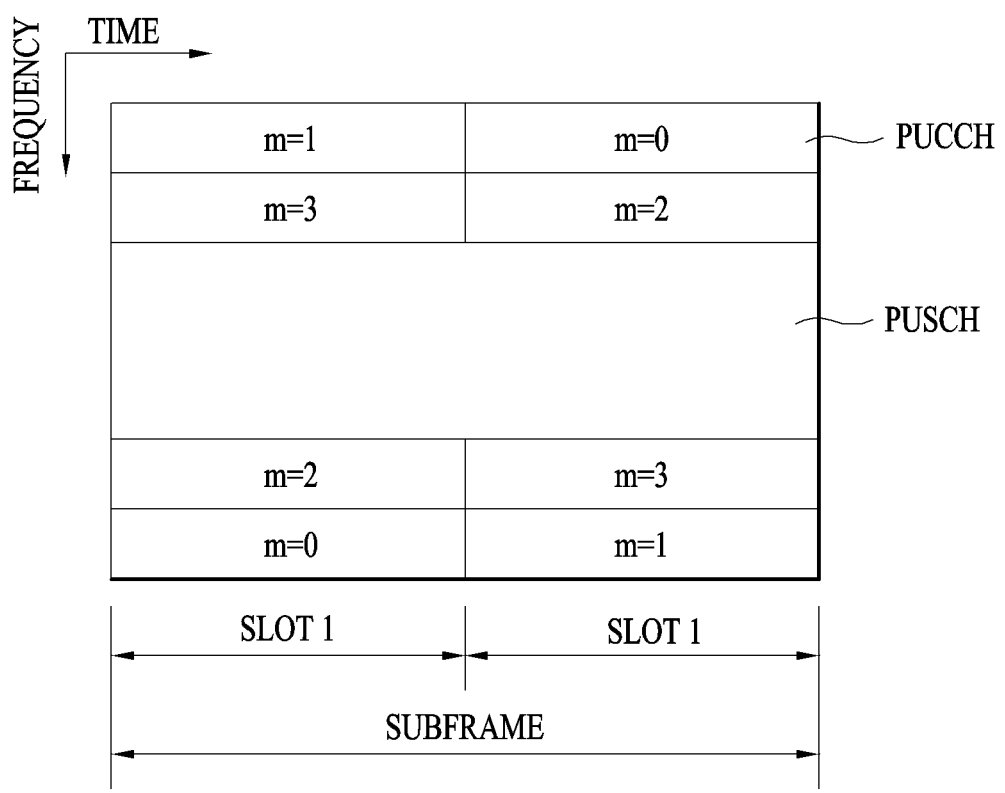
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Figure 7:
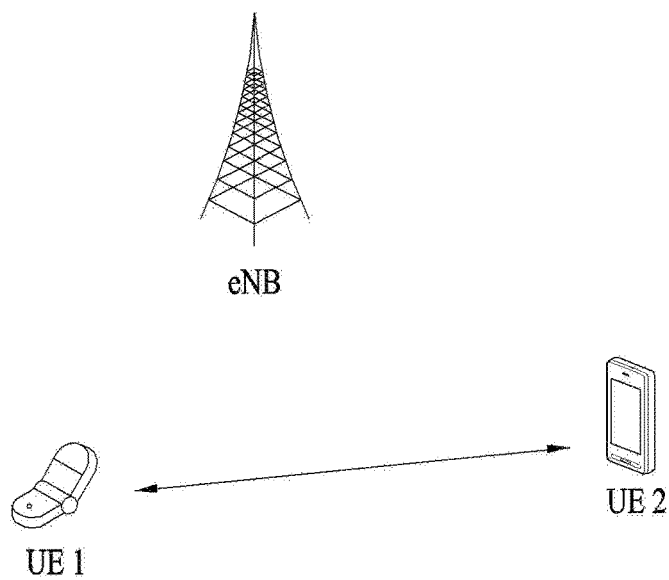
FIG. 7 is a conceptual diagram illustrating D2D communication.

FIG. 7 is a conceptual diagram illustrating direct D2D communication.

Referring to FIG. 7, during D2D communication (i.e., direct D2D communication) in which the UE wirelessly communicates with another UE, the eNB may transmit a scheduling message for indicating D2D transmission/reception. The UE participating in D2D communication may receive a D2D scheduling message from the eNB, and performs Tx/Rx operations indicated by the D2D scheduling message. Here, although a UE means a user terminal, a network entity such as an eNB may be regarded as a UE when transmitting and receiving a signal according to a communication method between UEs. Hereinafter, a link between UEs is referred to as a D2D link or a sidelink.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

If a transmitter has $N_T$ transmit (Tx) antennas and a receiver has $N_R$ receive (Rx) antennas, use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. R is the smaller of $N_T$ and $N_R$.

$$R_i = \min(N_T, N_R) \qquad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present. Regarding a transmission signal, up to $N_T$ pieces of information can be transmitted through the $N_T$ Tx antennas, as expressed as the following vector.

$$S = [s_1, s_2, \ldots, s_{N_T}]^T \qquad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, $N_T$ transmission signals $x_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $W_{ij}$ denotes a weight of an i-th Tx antenna and a j-th piece of information. W is referred to as a weight matrix or a precoding matrix.

$$x = \qquad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \qquad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \qquad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

Hereinafter, a multi-user superposition transmission (MUST) scheme will be described.

MUST refers to a multiple access scheme that may achieve high bandwidth efficiency by allocating a plurality of UEs to the same frequency-time resources using a preset power ratio and mitigating preset inter-user interference, basically based on the premise that a signal is transmitted to the interference cancellation receiver, in addition to time-frequency domain resource allocation of a legacy OFDMA system. MUST is under discussion as a significant candidate technology for a future 5th generation (5G) system.

Resource allocation of an eNB and interference cancellation of a UE are important techniques in the MUST system. Particularly, receivers may be classified into symbol level interference cancellation (SIC) receivers represented by a maximum likelihood (ML) receiver, and codeword level interference cancellation (CWIC) receivers represented by a minimum mea-square error (MMSE)-based linear CWIC (L-CWC) receiver and an ML-CWC receiver, depending on their interference cancellation schemes. A reception gain is different in a given environment according to each interference cancellation scheme. In general, an ML receiver and a CWIC receiver achieve high gains in proportion to the implementation complexity of a UE.

Downlink data is transmitted to a plurality of UEs using the same time and the same frequency through the MUST scheme. At this time, a near UE located near an eNB and having excellent geometry and a far UE far from the eNB pair with each other to receive a downlink service and most power is used for the far UE and some of the remaining power is used for the near UE.

The far UE receives interference from the near UE. However, since transmit power of the data of the near UE is significantly weaker than that of the far UE and the level of interference is decreased due to high path loss, the far UE may receive data without advanced interference cancellation such as SLIC (Symbol-Level Interference Cancellation)/ML (Maximum Likelihood)/CWIC (Code-word level Interference Cancellation). In contrast, since the near UE receives significant interference from the far UE, the near UE reduces interference using IC such as SLIC/ML/CWIC and then receives data.

Figure 8:
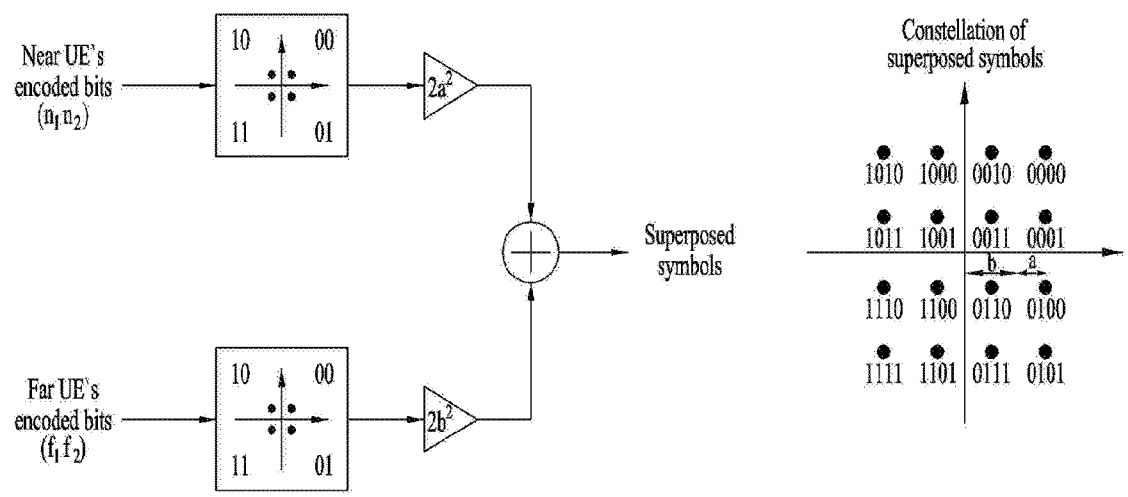
FIG. 8 is a diagram illustrating one of transmission schemes of a MUST system.

In a MUST system, various transmission schemes may be used. FIG. 8 is a diagram illustrating one of transmission schemes of a MUST system.

Referring to the left side of FIG. 8, information bits which are the data of the near UE and information bits which are the data of the far UE are converted into coded bits through respective channel coding. Thereafter, the coded bits of each UE pass through each modulator to generate constellation symbols of the near UE and the far UE. Thereafter, power is appropriately allocated to each constellation symbol and the two constellation symbols are combined to generate one superposed symbol.

For example, if it is assumed that the coded bits of the near UE and the coded bits of the far UE are respectively 00 and 11, the constellation symbol of each UE is generated through QPSK modulation and is allocated power. Thereafter, two QPSK symbols are combined to generate one superposed symbol. The generated superposed symbol is shown at the right side of FIG. 8 and the superposed symbol is subjected to layer mapping and precoding and is transmitted through an eNB antenna.

Hereinafter, a method of transmitting and receiving a signal using device-to-device (D2D) communication and superposition coding in a wireless communication according to the present disclosure will be described. More specifically, a method of, at a D2D UE, transmitting data to a counterpart UE of D2D communication through cooperative relay using D2D communication and superposition coding while relaying data of another user having an inferior channel environment using cellular communication is proposed.

<Communication System Model>

Figure 9:
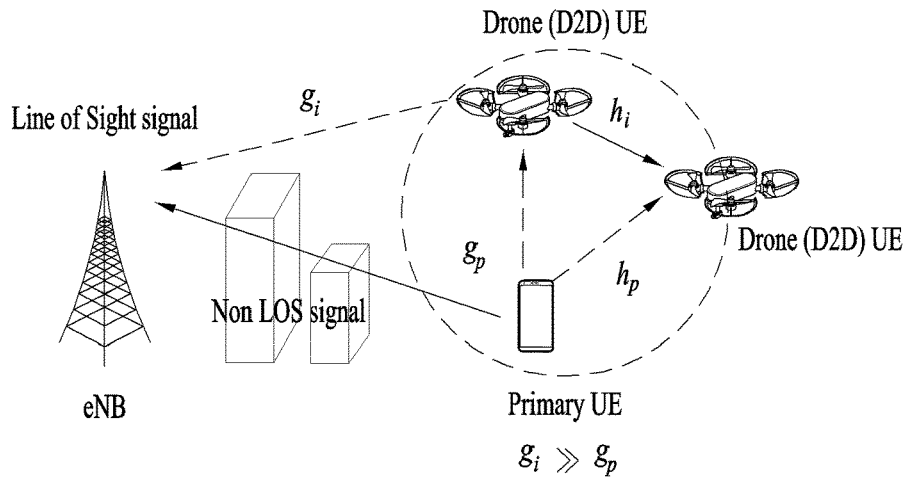
FIG. 9 is a diagram illustrating a communication system model according to the present invention.

FIG. 9 is a diagram illustrating a communication system model according to the present disclosure.

Referring to FIG. 9, assume that a primary UE (user) communicates with an eNB, a relay UE is connected to the eNB, and the relay UE may perform device-to-device communication with a target UE. In FIG. 9, $g_p$ denotes link gain between the primary UE and the eNB, and $g_i$ denotes link gain between the relay UE and the eNB. In addition, $h_p$ denotes link gain between the primary UE and the target UE, and $h_i$ denotes link gain between the relay UE and the target UE. Lastly, $p_p$ denotes transmit power of the primary UE and $p_i$ denotes D2D transmit power of the relay UE.

Figure 10:
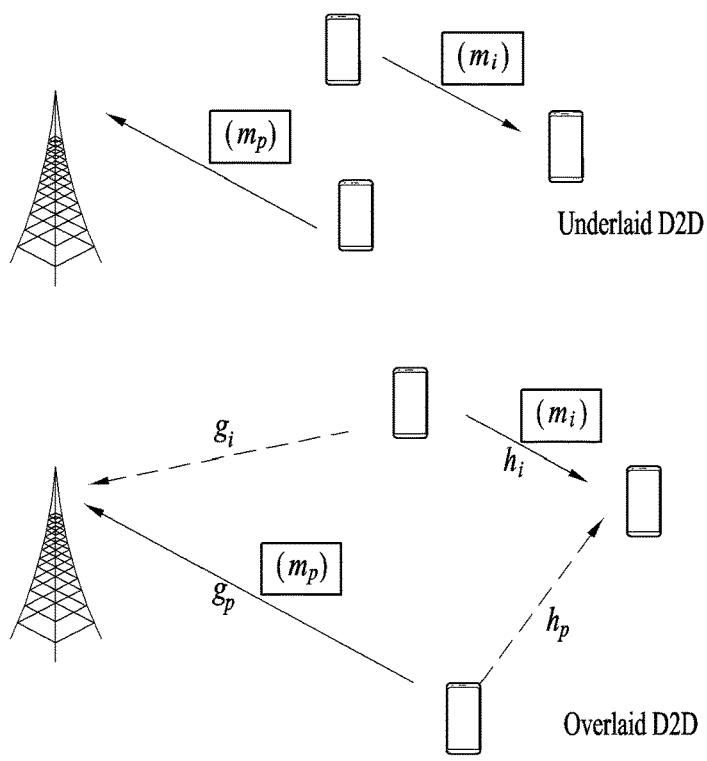
FIG. 10 is a diagram illustrating an environment in which a data rate of a primary UE and a data rate of a relay UE are calculated according to the present invention.

FIG. 10 is a diagram illustrating an environment in which a data rate of a primary UE and a data rate of a relay UE are calculated according to the present disclosure.

Referring to FIG. 10, in general, when the primary UE and the relay UE do not interfere with each other (that is, underlaid D2D), the data rate of the primary UE and the data rate of the relay UE may be expressed as shown in Equations 8 and 9 below, respectively. In Equations 8 and 9 below, N denotes additive nose of a receiver.

$$R_p = \log\left(1 + \frac{g_p p_p}{N}\right) \quad \text{[Equation 8]}$$

$$R_i = \log\left(1 + \frac{h_i p_i}{N}\right) \quad \text{[Equation 9]}$$

In addition, referring to FIG. 10, when communication from the primary UE to the eNB and D2D communication from the relay UE to the target UE are simultaneously performed (that is, Overlaid D2D), the data rate of the primary UE and the data rate of the relay UE including interference may be expressed as shown in Equations 10 and 11 below.

$$R_p = \log\left(1 + \frac{g_p p_p}{g_i p_i + N}\right) \quad \text{[Equation 10]}$$

$$R_i = \log\left(1 + \frac{h_i p_i}{h_p p_p + N}\right) \quad \text{[Equation 11]}$$

<Superposition Coding for Cooperative Relay>

When the channel environment of the primary UE is bad, a neighboring UE is used as a relay and, at the same time, superposition coding is used for D2D communication between the relay UE and another UE in the present disclosure.

Figure 11:
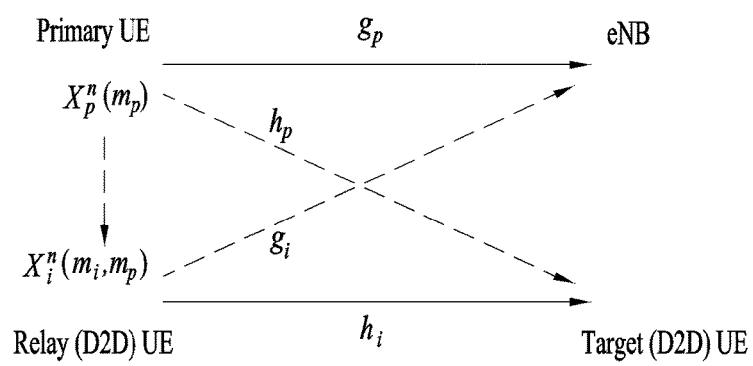
FIGS. 11 and 12 are diagrams illustrating examples of applying superposition coding according to an embodiment of the present invention.
Figure 12:
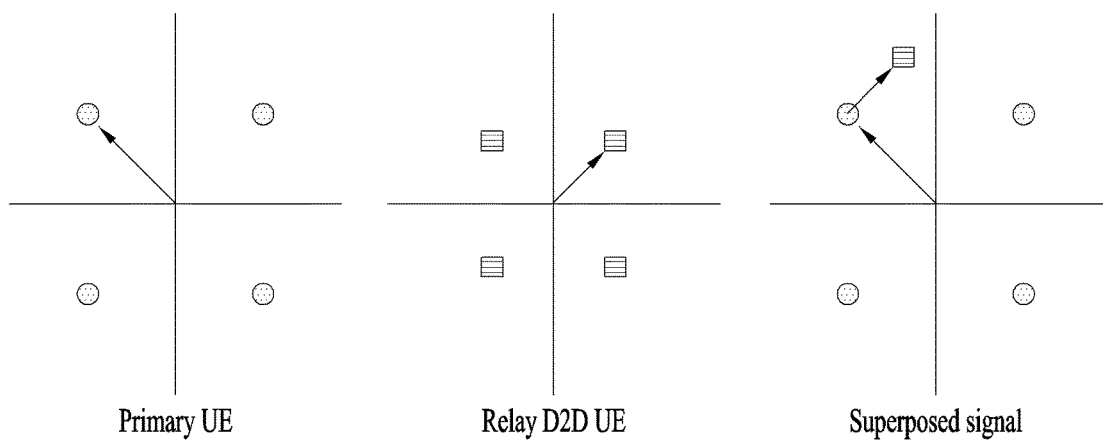

FIGS. 11 and 12 are diagrams illustrating examples of applying superposition coding according to an embodiment of the present disclosure.

Firstly, it is assumed that the primary UE's message is $m_p \in \{0, 1, \ldots, 2^{nR_p}\}$ and the Relay D2D UE's message is $m_i \in \{0, 1, \ldots, 2^{nR_i}\}$. Further, the average power of the transmitted signals of the primary UE and Relay D2D UE is constrained by $p_p$ and $p_i$, such as Equation 12 below.

$$\|X_p^n\|^2 \leq n \cdot p_p$$

$$\|X_i^n\|^2 \leq n \cdot p_i \quad \text{[Equation 12]}$$

The channel can be described by the per time sample equation 13 below. In equation 13, Z is distributed according to $\square$ (0, N).

$$Y_p = g_p X_p + g_i X_i + Z$$

$$Y_i = h_p X_p + h_i X_i + Z \quad \text{[Equation 13]}$$

Therefore, the optimal coding strategy for the relay D2D UE is the superposition coding according to Equation 14 and FIG. 12.

$$X_i^n = \hat{X}_i^n + \alpha_i \sqrt{\frac{p_i}{p_p}} X_p^n \quad \text{[Equation 14]}$$

In Equation 14 and FIG. 12, the first term $\hat{X}_i^n$ denotes that the relay D2D UE's codeword $m_i$ is dirty-paper coded based on the primary user's codeword $m_p$ (so called the dirty-paper code part), and the second term, the cooperation part, is duplicated information of primary UE, which is combined with the information from the primary UE in order to support the primary UE's data rate. Here, $\alpha_i^2$ denotes the power ratio of the cooperation part. $\alpha_i^2 \in [0,1]$.

By using the dirty-paper coding technique, the maximum achievable rate is the same as if the interference was also known at the receiver. The achievable rate of the Primary UE can be expressed as following Equation 15.

$$R_p = \frac{1}{2}\log\left(1 + \frac{\left(\sqrt{g_p p_p} + \alpha_i^2 \sqrt{g_i p_i}\right)^2}{N + g_i(1 - \alpha_i^2)p_i}\right) \quad \text{[Equation 15]}$$

Further, the achievable rate of relay D2D UE is as Equation 16 below.

$$R_i = \frac{1}{2}\log\left(1 + \frac{g_i(1 - \alpha_i^2)p_i}{N}\right) \quad \text{[Equation 16]}$$

Hereinafter, operation of the UE according to the above-described proposals, and, more particularly, a process of selecting and deciding a relay UE will be described.

First, the primary UE broadcasts, to neighboring UEs, an indication for finding a relay UE which will cooperate on transmission of data thereof. At least one of the neighboring UEs which are transmitting or will transmit data to another UE using D2D communication transmits a response indicating that relay is possible to the primary UE. The primary UE transmits the data thereof to the relay UE which has transmitted the response indicating that relay is possible.

Inversely, the relay UE may broadcast, to neighboring primary UEs, an indication for finding a primary UE which will transmit data in cooperation therewith, in order to secure resources (frequency) for transmitting the data to the target D2D UE. That is, the indication for finding the primary UE may replace a resource request signal for D2D communication. A UE having an inferior channel environment, that is, the primary UE, transmits, to the D2D relay UE, a response indicating that the primary UE requires relay. Here, the relay UE may transmit, to the primary UE, a confirm indication indicating that the relay UE may perform relay. Lastly, the primary UE transmits data thereof to the relay UE.

Figure 13:
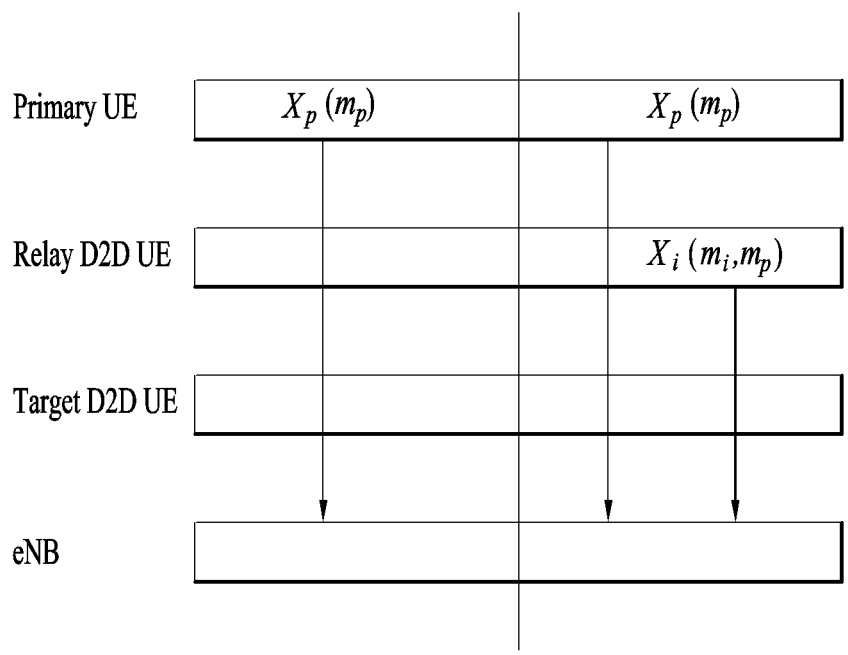
FIG. 13 is a diagram illustrating an example of performing cooperative relay according to the present invention.

FIG. 13 is a diagram illustrating an example of performing cooperative relay according to the present disclosure.

Referring to FIG. 13, first, the primary UE selects a relay UE according to the above-described UE operation and transmits a message $X_p(m_p)$ for relay to the selected relay UE.

Next, the selected relay UE performs synchronization with the primary UE and simultaneously transmits a message of the primary UE and a message for D2D communication using a MUST scheme. In particular, in FIG. 13, the message of the primary UE and the message for D2D communication transmitted simultaneously are denoted by $X_i(m_i, m_p)$ and are transmitted (that is, using the MUST scheme) after applying superposition coding. Thereafter, the primary UE performs synchronization with the relay UE similarly to the relay UE and transmits a message $X_p(m_p)$ thereof to the eNB.

The primary BS receives the data of the primary UE and the superposition-coded message of the relay UE and, at the same time, performs decoding. In addition, the target D2D UE receives the data of the relay UE and restores the data thereof through SIC (Symbol Level Interference Cancellation).

Figure 14:
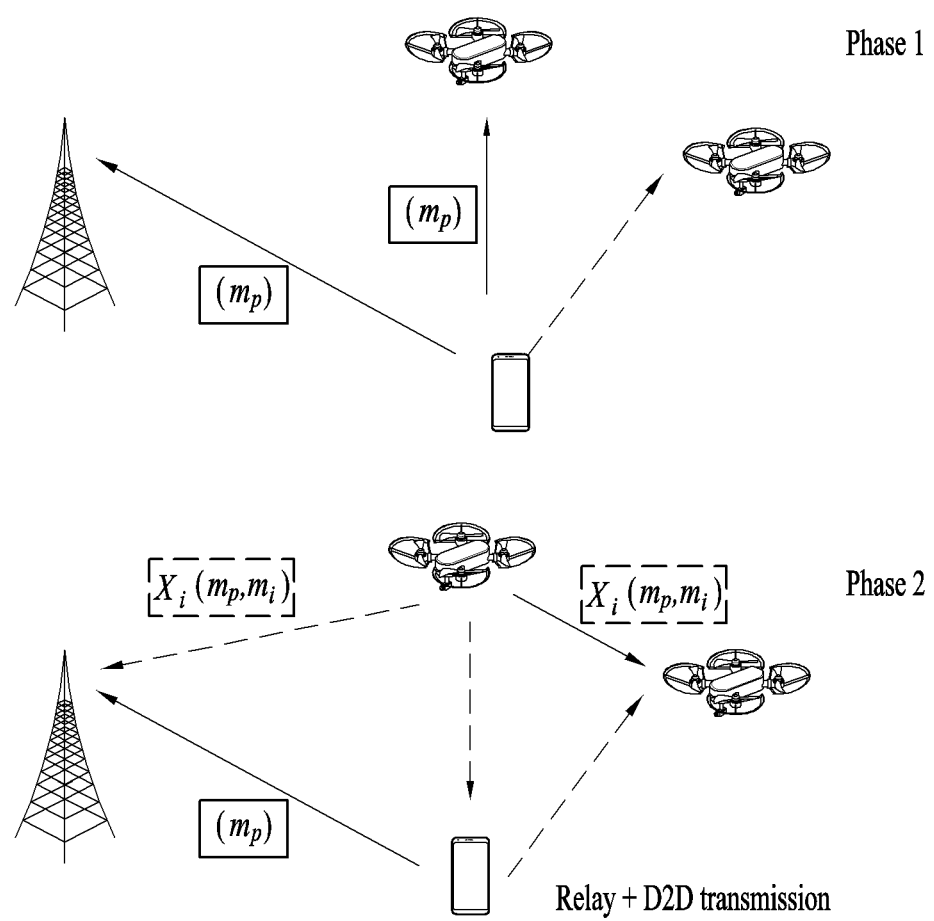
FIGS. 14 to 16 are diagrams illustrating other examples of cooperative relay according to the present invention.
Figure 15:
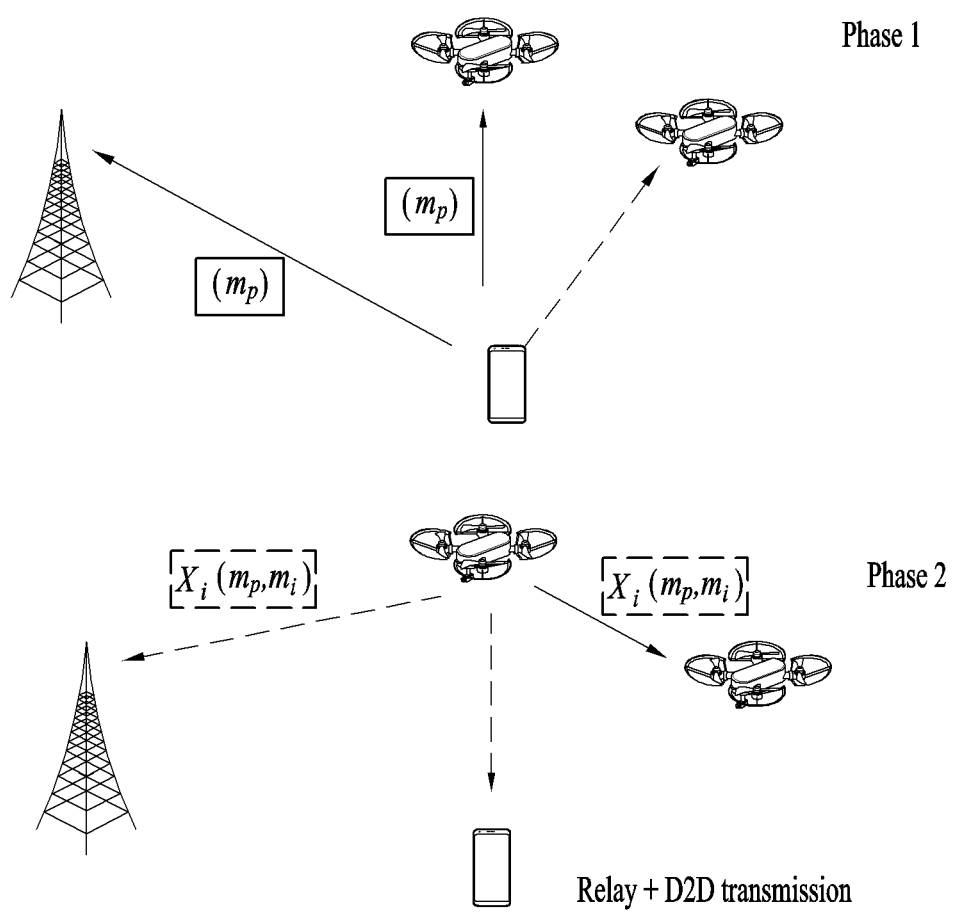
Figure 16:
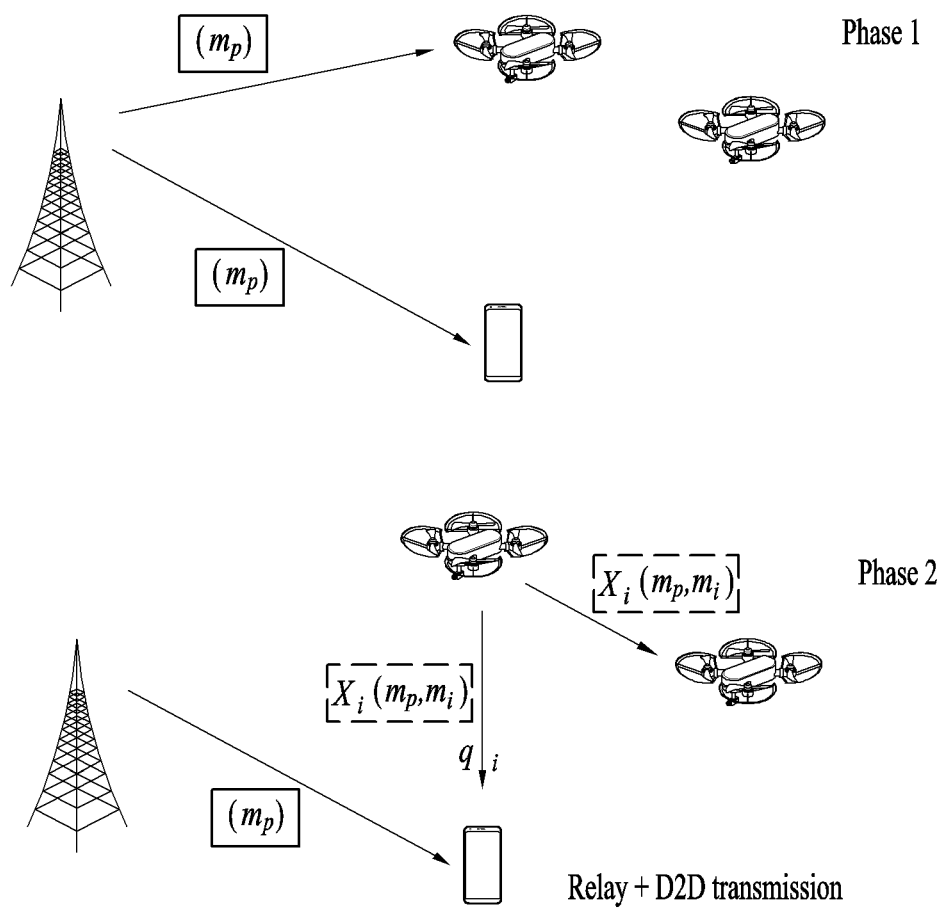

The transmission schemes shown in FIGS. 14 to 16 may be considered using the cooperative relay method of the present disclosure. FIGS. 14 to 16 are diagrams illustrating other examples of cooperative relay according to the present disclosure.

First, FIG. 14 shows a method of, at a relay UE, performing cooperative relay with respect to uplink transmission of a primary UE and, at the same time, transmitting D2D data thereof to another relay UE. The primary UE transmits a message $m_p$ to the eNB and the relay UE in Phase 1 and the relay UE transmits $X_i(m_i, m_p)$ obtained by superposition coding with respect to a message of the primary UE and a message for D2D communication using a MUST scheme in Phase 2. Preferably, the primary UE also transmits a message $m_p$ to the eNB in Phase 2. More preferably, $X_i(m_i, m_p)$ may be transmitted through D2D data transmission resources.

In this case, the data rate of the primary UE and the data rate of the relay UE may be expressed as shown in Equations 17 and 18 below, respectively.

$$R'_p = \log\left(1 + \frac{\left(\sqrt{g_p p_p} + \sqrt{g_i p_i}\, x_i\right)^2}{N_p + g_i(1-x_i^2)p_i}\right)$$ [Equation 17]

$$R_D = \log\left(1 + \frac{h_i(1-x_i^2)p_i}{N}\right)$$ [Equation 18]

FIG. 15 shows a method of, at a relay UE, performing cooperative relay with respect to uplink transmission of a primary UE and, at the same time, transmitting D2D data thereof to another relay UE. However, the primary UE does not transmit a message $m_p$ to the eNB even in Phase 2. In this case, the data rate of the primary UE and the data rate of the relay UE may be expressed as shown in Equations 19 and 20 below, respectively.

$$R'_p = \log\left(1 + \frac{g_p p_p x_i^2}{N_p + g_i(1-x_i^2)p_i}\right)$$ [Equation 19]

$$R_D = \log\left(1 + \frac{h_i(1-x_i^2)p_i}{N}\right)$$ [Equation 20]

Lastly, FIG. 16 shows a method of, at a relay UE, performing cooperative relay with respect to downlink transmission of a primary UE and, at the same time, transmitting D2D data thereof to another relay UE using a MUST scheme. The eNB transmits a message $m_p$ to the primary UE and the relay UE in Phase 1 and the relay UE transmits $X_i(m_i, m_p)$ obtained by performing superposition coding with respect to the message of the primary UE and the message for D2D communication in Phase 2. Preferably, the eNB also transmits a message $m_p$ to the primary UE even in Phase 2. More preferably, $X_i(m_i, m_p)$ may be transmitted through D2D data transmission resources.

In this case, the data rate of the primary UE and the data rate of the relay UE may be expressed as shown in Equations 21 and 22 below, respectively.

$$R'_p = \log\left(1 + \frac{\left(\sqrt{g_p p_p} + \sqrt{q_i p_i}\, x_i\right)^2}{N_p + q_i(1-x_i^2)p_i}\right)$$ [Equation 21]

$$R_D = \log\left(1 + \frac{h_i(1-x_i^2)p_i}{N}\right)$$ [Equation 22]

Figure 17:
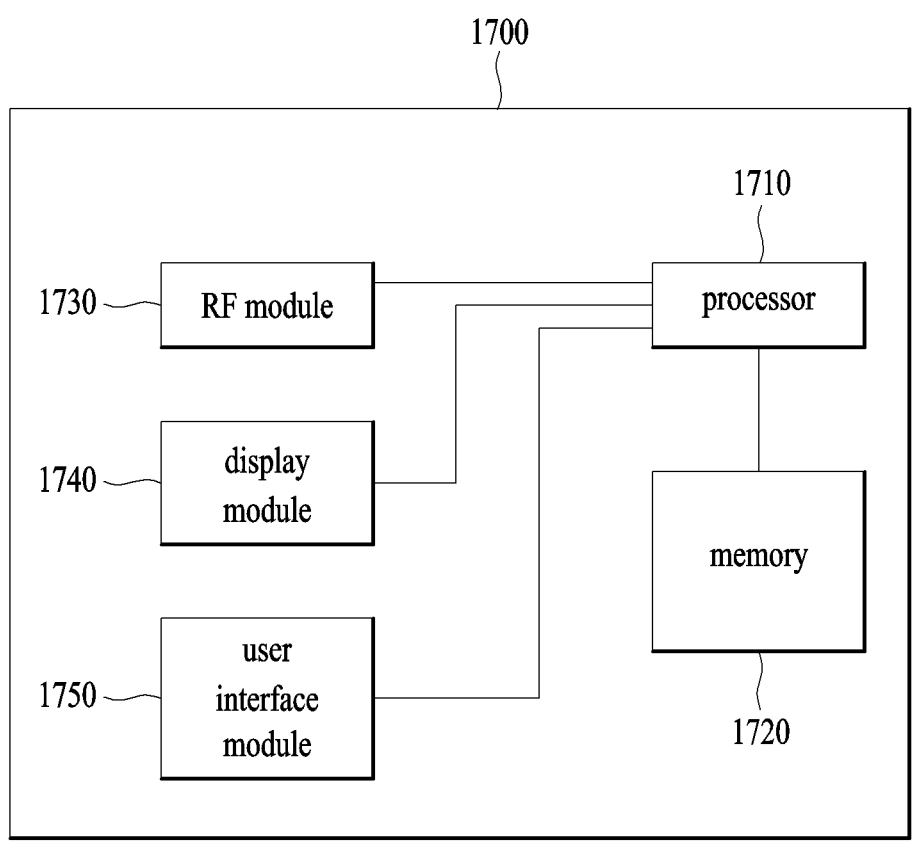
FIG. 17 is a block diagram illustrating a communication device according to embodiments of the present invention.

FIG. 17 is a block diagram of a communication apparatus according to an embodiment of the present invention.

Referring to FIG. 17, a communication device 1700 includes a processor 1710, a memory 1720, a radio frequency (RF) module 1730, a display module 1740, and a user interface (UI) module 1750.

The communication device 1700 is illustrated for convenience of description and some modules may be omitted. The communication device 1700 may further include necessary modules. Some modules of the communication device 1700 may be further divided into sub-modules. The processor 1700 is configured to perform operations according to the embodiments of the present invention exemplarily described with reference to the drawings. Specifically, for a detailed description of operations of the processor 1700, reference may be made to the description described with reference to FIGS. 1 to 16.

The memory 1720 is connected to the processor 1710 and stores operating systems, applications, program code, data, and the like. The RF module 1730 is connected to the processor 1710 and performs a function of converting a baseband signal into a radio signal or converting a radio signal into a baseband signal. For this, the RF module 1730 performs analog conversion, amplification, filtering, and frequency upconversion or performs inverse processes thereof. The display module 1740 is connected to the processor 1710 and displays various types of information. The display module 1740 may include, but is not limited to, a well-known element such as a liquid crystal display (LCD), a light emitting diode (LED), or an organic light emitting diode (OLED). The UI module 1750 is connected to the processor 1710 and may include a combination of well-known UIs such as a keypad and a touchscreen.

According to embodiments of the present disclosure, it is possible to more efficiently transmit and receive a signal using device-to-device communication and superposition coding in a wireless communication system.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

In this document, a specific operation described as performed by an eNB may be performed by an upper node of the eNB. Namely, it is apparent that, in a network comprised of a plurality of network nodes including an eNB, various operations performed for communication with a UE may be performed by the eNB, or network nodes other than the eNB. The term eNB may be replaced with the terms fixed station, Node B, eNode B (eNB), access point, etc.

The embodiments according to the present invention can be implemented by various means, for example, hardware, firmware, software, or combinations thereof. In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of transmitting a signal by a relay user equipment (UE) in a wireless communication system, the method comprising:
    broadcasting a searching message to search for a first UE having uplink data for relaying among a plurality of primary UEs;
    receiving, from the first UE, a request message to relay the uplink data of the first UE;
    transmitting, to the first UE, a response message to accept the uplink data in response to the request message;
    receiving, from the first UE, the uplink data;
    generating an uplink relay signal by performing superposition coding between the uplink data and sidelink data to be transmitted to a second UE; and
    transmitting the uplink relay signal to a base station and the second UE,
    wherein data rate of the uplink relay signal is determined by <Equation A>:

$$R_D = \log\left(1 + \frac{h_i(1-x_i^2)p_i}{N}\right), \qquad \langle\text{Equation A}\rangle$$

where $R_D$ is a data rate of the uplink relay signal, $h_i$ is a link gain between the relay UE and the second UE, $x_i$ is a power ratio between the uplink data and the sidelink data, $p_i$ is a transmission power of the relay UE and N is additive noise of the second UE.

2. The method according to claim 1, further comprising:
    receiving, from the base station, downlink data for relaying;
    generating an uplink relay signal by performing superposition coding between the downlink data and the sidelink data; and
    transmitting the downlink relay signal to the first UE and the second UE.

3. The method according to claim 2, wherein the uplink relay signal and the downlink relay signal are transmitted in resources for transmitting the sidelink data.

4. A relay user equipment (UE) in a wireless communication system, the relay UE comprising:
    a transceiver; and
    a processor connected to the transceiver,
    wherein the processor is configured to:
        broadcast a searching message to search for a first UE having uplink data for relaying among a plurality of primary UEs,
        control the transceiver to receive, from the first UE, a request message to relay the uplink data of the first UE,
        control the transceiver to transmit, to the first UE, a response message to accept the uplink data in response to the request message,
        control the transceiver to receive, from the first UE, the uplink,
        generate an uplink relay signal by performing superposition coding between the uplink data and sidelink data to be transmitted to a second UE, and
        control the transceiver to transmit the uplink relay signal to a base station and the second UE, and
    wherein data rate of the uplink relay signal is determined by <Equation A>:

$$R_D = \log\left(1 + \frac{h_i(1-x_i^2)p_i}{N}\right), \qquad \langle\text{Equation A}\rangle$$

where $R_D$ is a data rate of the uplink relay signal, $h_i$ is a link gain between the relay UE and the second UE, $x_i$ is a power ratio between the uplink data and the sidelink data, $p_i$ is a transmission power of the relay UE and N is additive noise of the second UE.

5. The relay UE according to claim 4, wherein the processor is configured to:
    receive, from the base station, downlink data for relaying, generate a downlink relay signal by performing superposition coding between the downlink data and the sidelink data, and transmit the downlink relay signal to the first UE and the second UE.

6. The relay UE according to claim 5, wherein the uplink relay signal and the downlink relay signal are transmitted in resources for transmitting the sidelink data.

* * * * *